(12) United States Patent
Bittner (10) Patent No.: US 9,956,631 B2
(45) Date of Patent: *May 1, 2018

(54) MACHINE FOR MACHINING GEAR TEETH AND GEAR TEETH MACHINING METHOD

(71) Applicant: Sikorsky Aircraft Corporation, Stratford, CT (US)

(72) Inventor: Edward H. Bittner, Madison, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/433,726

(22) Filed: Feb. 15, 2017

(65) Prior Publication Data

US 2017/0157690 A1 Jun. 8, 2017

Related U.S. Application Data

(63) Continuation of application No. 14/158,097, filed on Jan. 17, 2014, now Pat. No. 9,597,743.

(51) Int. Cl.
*B23H 5/08* (2006.01)
*B23F 7/00* (2006.01)
(Continued)

(52) U.S. Cl.
CPC ............. *B23H 9/003* (2013.01); *B23F 5/02* (2013.01); *B23F 7/00* (2013.01); *B23F 17/00* (2013.01);
(Continued)

(58) Field of Classification Search
CPC ... B23H 5/00; B23H 5/06; B23H 5/08; B23H 7/00; B23H 9/00; B23H 9/003;
(Continued)

(56) References Cited

U.S. PATENT DOCUMENTS 2,764,543 A * 9/1956 Comstock ................ B23H 5/08
204/217
2,920,026 A * 1/1960 Kistler .................. B24B 53/001
204/218
(Continued)

FOREIGN PATENT DOCUMENTS

GB 875476 A 8/1961
GB 1400063 A * 7/1975 ............... B23Q 5/26

OTHER PUBLICATIONS

International Search Report issued in PCT/US15/11572, dated Apr. 13, 2015; 8 pages.
(Continued)

*Primary Examiner* — Eileen Morgan
(74) *Attorney, Agent, or Firm* — Cantor Colburn LLP (57) ABSTRACT

A machine for machining a workpiece having a first central longitudinal axis passing through a workpiece plane that is disposed orthogonally relative to the first central longitudinal axis is provided. The machine includes a chuck or fixture on which the workpiece is disposable, a grinding spindle having a body, a wheel supporting an abrasive and an insulator electrically isolating the wheel from the body, the wheel being operable to remove material from the workpiece, the grinding spindle having a second central longitudinal axis about which the grinding spindle rotates, the second central longitudinal axis of the grinding spindle passing through the workpiece in the workpiece plane so as to create a continuous gear tooth on the workpiece and an electrochemical grinding (ECG) element configured to execute ECG processing on the grinding spindle and the workpiece to soften the workpiece as the gear tooth is being created by the grinding spindle.

19 Claims, 8 Drawing Sheets

(51) Int. Cl.
| | |
|---|---|
| *F16H 55/06* | (2006.01) |
| *B23F 5/02* | (2006.01) |
| *B23H 9/00* | (2006.01) |
| *B23H 5/06* | (2006.01) |
| *B23F 17/00* | (2006.01) |
| *B23P 15/14* | (2006.01) |
| *F16H 55/17* | (2006.01) |

(52) U.S. Cl.
CPC .............. *B23H 5/06* (2013.01); *B23H 5/08* (2013.01); *B23P 15/14* (2013.01); *F16H 55/06* (2013.01); *F16H 55/17* (2013.01)

(58) Field of Classification Search
CPC ... B23H 9/02; B23H 9/06; B23H 9/08; B23H 17/00; B23F 5/02; F16H 55/06
USPC .............. 451/47, 54, 57, 219, 253
See application file for complete search history.

(56) References Cited

U.S. PATENT DOCUMENTS

| | | | |
|---|---|---|---|
| 3,442,785 A * | 5/1969 | Easton | B23H 5/08 204/224 M |
| 3,473,267 A * | 10/1969 | Cooper | B23F 5/02 204/212 |
| 3,531,976 A | 10/1970 | Fuhrman | |
| 3,553,095 A | 1/1971 | Daniel | |
| 3,694,340 A | 9/1972 | Takahashi | |
| 3,877,273 A | 4/1975 | Culver | |
| 5,659,955 A | 8/1997 | Plamper | |
| 5,865,239 A | 2/1999 | Carr | |
| 5,908,067 A | 6/1999 | Carr | |
| 6,732,606 B1 | 5/2004 | Zhu et al. | |
| 6,912,786 B2 | 7/2005 | Jinkins et al. | |
| 7,364,803 B1 | 4/2008 | Anderson | |
| 7,854,995 B1 | 12/2010 | Anderson | |
| 2004/0031152 A1* | 2/2004 | Jinkins | B23F 7/00 29/893 |
| 2006/0240746 A1 | 10/2006 | Bittner et al. | |
| 2010/0111628 A1 | 5/2010 | Megens et al. | |
| 2012/0114441 A1 | 5/2012 | Neumaier et al. | |
| 2013/0101367 A1 | 4/2013 | Mundt et al. | |

OTHER PUBLICATIONS

Molecular Decomposition Process Grinding Technology Oberg Industries. Dec. 27, 2013. Retrieved on Mar. 13, 2015. Retrieved from internet: <http://www.oberg.com/precision-manufacturing/mdp-electrochemical-grinding.aspx?WT.svl=1>.

Written Opinon issued in PCT/US15/11572, dated Apr. 13, 2015; 5 pages.

* cited by examiner

MACHINE FOR MACHINING GEAR TEETH AND GEAR TEETH MACHINING METHOD

CROSS-REFERENCE TO RELATED APPLICATIONS

The present application is a continuation of U.S. patent application Ser. No. 14/158,097, filed on Jan. 17, 2014, the contents of which are incorporated by reference herein in their entirety.

BACKGROUND OF THE INVENTION

The subject matter disclosed herein relates to a machine and a machining method and, more particularly, to a machine for machining or grinding gear teeth and to a gear teeth grinding method.

Gears are used in various industrial and technological applications to permit power transmission from one rotating or translating element to another. Each gear generally includes an array of gear teeth that mesh with the gear teeth of another gear so that the rotation or translation of the first gear can be transmitted to the second. The shapes of the gear teeth can be varied with some gear teeth being linearly shaped, some being helically shaped and others being provided as double-helical or herringbone shaped, and still others being provided as arcuate shaped (or C-Gear) gear teeth.

Gears having gear teeth that are double helically (or herringbone) shaped include a side-to-side (not face to face) combination of two helical gears of opposite hands and, from a top-wise viewpoint, the helical grooves form a V formation with an apex in the middle. Whereas helical gears tend to produce axial loading, a side-thrust of one half of each gear is balanced by that of the other half. This means that gears having double helical or herringbone shaped gear teeth can be used in torque gearboxes without requiring a substantial thrust bearing. Gears having arcuate shaped teeth may also have self-aligning characteristics, which eliminate axial loads with the added benefit of reducing gear tooth end loading due to their inherent ability to adapt to axis misalignment.

However, while these shape gears are desired, due to manufacturing limitations, such gears can only be partially formed. Specifically, current manufacturing techniques use a large grinding wheel which forces a gap to be designed at the apex of the V formation since, when forming one tooth of the V formation, the grinding wheel would otherwise collide with the other tooth of the V formation. Thus, when using a grinding wheel, a true V formation is not formed since a space is required between adjacent teeth to allow for the size of grinding wheel. Further, as these wheels only provide straight line grooves, the resulting teeth are limited to linear shapes. Conversely, while non-wheel precision grinding shapes might allow more complex shapes such as curved lines, these non-wheel shapes do not allow for teeth production at a speed to be economical to create gears in a manufacturing setting. As such, there is a need for a grinding methodology which allows for the creation of gapless double helical/herringbone gear shapes and is sufficiently robust to be used in a manufacturing setting.

BRIEF DESCRIPTION OF THE INVENTION

According to one aspect of the invention, a machine for machining a workpiece having a first central longitudinal axis passing through a workpiece plane. The workpiece plane is disposed orthogonally relative to the first central longitudinal axis is provided. The machine includes a chuck or fixture on which the workpiece is disposable, a grinding spindle having a body, a wheel supporting an abrasive and an insulator electrically isolating the wheel from the body, the wheel being operable to remove material from the workpiece, the grinding spindle having a second central longitudinal axis about which the grinding spindle rotates, the second central longitudinal axis of the grinding spindle passing through the workpiece in the workpiece plane so as to create a continuous gear tooth on the workpiece and an electrochemical grinding (ECG) element configured to execute ECG processing on the grinding spindle and the workpiece to soften the workpiece as the gear tooth is being created by the grinding spindle.

According to another aspect of the invention, a gear including at least one of apex gap-less double-helical shaped teeth, apex gap-less herringbone shaped teeth and c-shaped teeth is provided and is machined by a process. The process includes disposing a workpiece having a first central longitudinal axis passing through a workpiece plane disposed orthogonally relative to the first central longitudinal axis on a chuck, disposing a grinding spindle having a second central longitudinal axis such that the second central longitudinal axis of the grinding spindle passes through the workpiece in the workpiece plane, executing ECG processing on the grinding spindle and the workpiece and using the grinding spindle to remove material from the workpiece to form the at least one of the apex gap-less double-helical shaped teeth, apex gap-less herringbone shaped teeth and c-shaped teeth.

According to yet another aspect of the invention, a method of machining a gear is provided and includes disposing a workpiece having a first central longitudinal axis passing through a workpiece plane disposed orthogonally relative to the first central longitudinal axis on a chuck, disposing a grinding spindle having a second central longitudinal axis about which the grinding spindle rotates, the second central longitudinal axis of the grinding spindle passing through the workpiece in the workpiece plane, executing ECG processing on the grinding spindle and the workpiece to soften an area of the workpiece and using the grinding spindle to remove material from the area of the workpiece to create a continuous gear tooth having one of apex gap-less double-helical shaped gear teeth, apex gap-less herringbone shaped gear teeth and c-shaped gear teeth.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In helicopter transmission design, transmission weight reduction is of considerable importance. Thus, since the gears inside a transmission are normally the heaviest components in a drive system, reducing gear size and numbers of gears can be useful in reducing transmission weight and volume. As will be described below, gear size reductions can be achieved by eliminating extraneous gear features, such as apex regions in a double helical (or herringbone) gear. Normally, such extraneous gear features are forced into use by manufacturing limitations.

Figure 1:
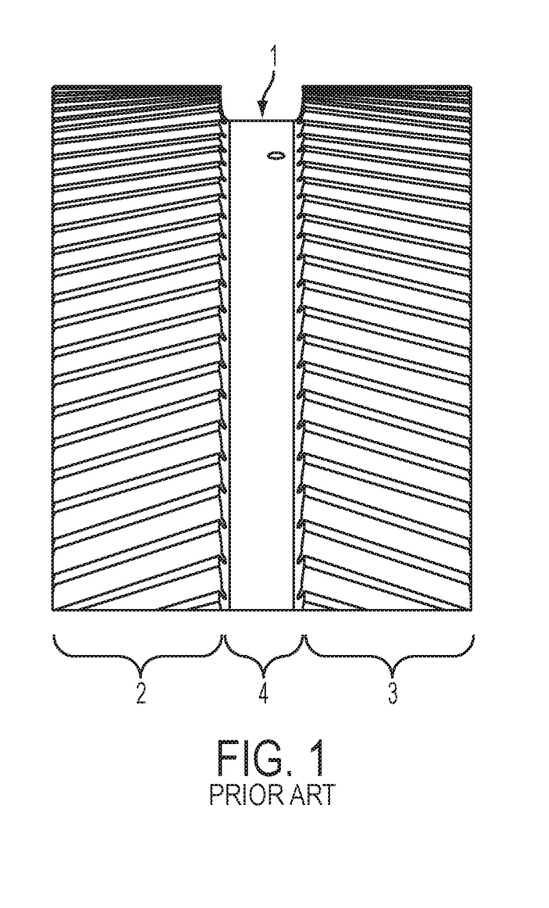
FIG. 1 is a circumferential view of a double helical gear with an apex gap.

With reference to FIG. 1, a conventional double helical gear 1 is provided. The conventional double helical gear 1 includes a first side 2 having a helical gear pattern of a first hand, a second side 3 having a helical gear pattern of a second hand opposite the first hand and an apex gap 4 defined axially between the first and second sides. The double helical gear 1 has a relatively high gear contact ratio owing to the presence of the helical gear patterns of the first and second sides 2 and 3. As a result, a gear mesh of the double helical gear exhibits increased strength and reduced noise signature as compared to that of a straight spur gear. The apex gap 4 is formed as a result of processes used to shape and precision grind the gear flanks and roots of the helical gear teeth. The apex gap 4 may add a considerable weight and size penalty to an overall transmission system in which the double helical gear 1 resides.

As will be described below, a gear grinding machine is provided and incorporates the use of a high speed grinding spindle with its center axis intersecting a center axis of the gear. Electrochemical grinding (ECG), and super abrasives, such as cubic boron nitride (CBN), may be utilized in a creep feed, deep cut, grinding process allowing for almost any conceivable gear flank design. The gear grinding machine produces hyper smooth ground surfaces of less than 1 micro inch Ra, burr free edges, with low heat generation and has the ability to grind exotic high hardness conductive materials. ECG allows for a very small grinding wheel with extremely low tool wear.

Figure 2:
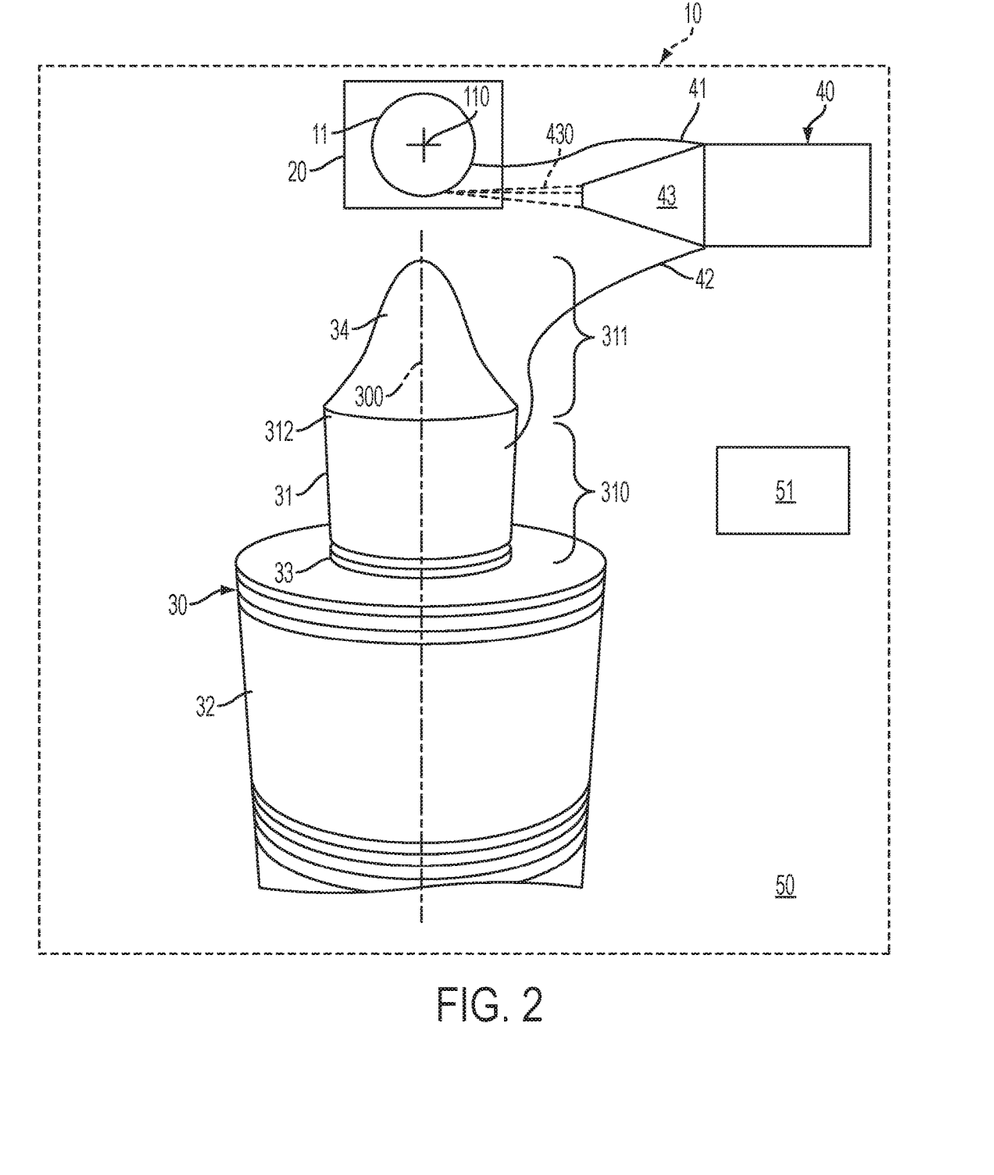
FIG. 2 is a schematic illustration of a machine for machining a gear in accordance with embodiments.
Figure 3:
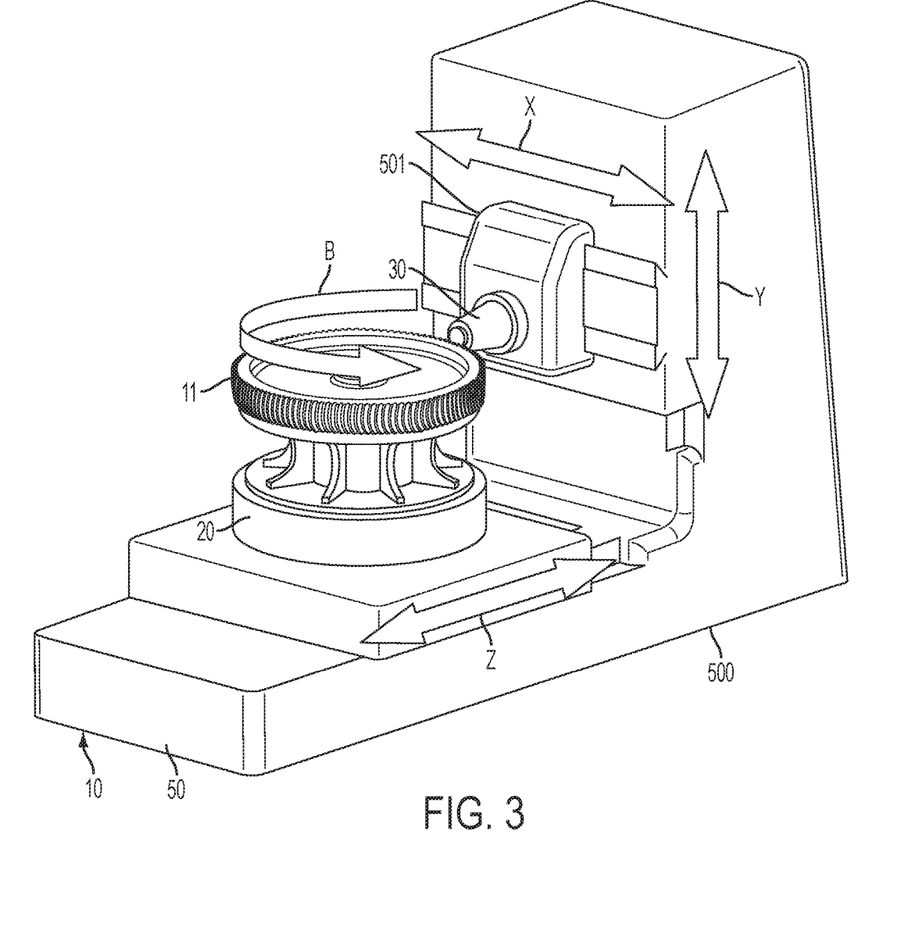
FIG. 3 is a perspective view of a machine for machining a gear in accordance with embodiments.

With reference to FIGS. 2 and 3, a machine 10 is provided for machining a workpiece 11. The workpiece 11 may have a substantially cylindrical initial shape with a first central longitudinal axis 110. The machine 10 includes a chuck or fixture 20 on which the workpiece 11 is disposable, and a grinding spindle 30. The grinding spindle 30 is configured to remove material from the workpiece 11 and has an elongate shape with a second central longitudinal axis 300. The grinding spindle 30 is disposable relative to the chuck 20 and the workpiece 11 such that the first and second central longitudinal axes 110 and 300 may or may not intersect one another. The machine 10 further includes an electrochemical grinding (ECG) element 40, which is configured to execute ECG processing on the grinding spindle 30 and the workpiece 11.

As shown in FIG. 2, the grinding spindle 30 may include a wheel 31, a spindle body 32 and an insulator 33. The wheel 31 is disposed to be rotatable about the second central longitudinal axis 300 of the grinding spindle 30 and includes a main wheel portion 310, which extends axially outwardly from an end of the spindle body 32, and a tip 311 defined at a distal end 312 of the main wheel portion 310. Abrasive 34 may be attached to the tip 311. The spindle body 32 is disposed to drive rotation of the wheel 31 about the central longitudinal axis 300 of the grinding spindle 30 and the insulator 33 is disposed to electrically insulate the wheel 31 from the spindle body 32.

In accordance with embodiments, the abrasive 34 may include a super abrasive, such as cubic boron nitride (CBN), diamond, etc. In addition, the tip 311 may be pencil-shaped or substantially conical and may have an involute profile 313. That is, an outer surface of the tip 311 may curve inwardly from an edge of the main wheel portion 310 with a radius of curvature that decreases with increasing axial distance from the edge of the main wheel portion 310. At the axial end of the tip 311, the radius of curvature may flip direction such that the end-most portion of the tip 311 has a blunt, rounded surface.

The ECG element 40 includes a first electrical lead 41, a second electrical lead 42 and a dispenser 43. The first electrical lead 41 is configured to positively charge the workpiece (anode) 11, the second electrical lead 42 is configured to negatively charge the grinding spindle (cathode) 30 and the dispenser 43 is configured to dispense electrolytic fluid 430 toward the workpiece 11. The opposite electrical charging of the workpiece 11 and the grinding spindle 30 in combination with the dispensation of the electrolytic fluid 430 toward the workpiece 11 causes a material of the workpiece 11 to soften by a substantial degree. This softening permits the grinding spindle 30 to remove material from the workpiece 11 in various forms or configurations. In some cases, the softening facilitates removal of material from the workpiece 11 by the grinding spindle to a desired depth in only a single pass and more rapidly than could be done without the softening.

The machine 10 further includes a machine body 50 and a controller 51. The machine body 50 may be provided, for example, as one or more support structures 500 and robotic arms 501 that are coupled to the chuck 10, the grinding spindle 30 and the ECG element 40 to position the various elements with respect to one another for grinding internal or external gears. The controller 51 may be provided as a computer numerical control (CNC) element. Where the controller 51 is provided as the CNC element, the machine body 50 is formed to define four axes (e.g., rotational axis B and spatial axes X, Y, Z, as shown in FIG. 3) and is capable of performing multi-axis synchronous motion. The axes may include the rotary axis B for indexing the workpiece 11, the vertical axis Y running parallel to the first central longitudinal axis 110 of the workpiece 11 (i.e., a cutter path), the horizontal axis X for centrality adjustments between the wheel 31 of the grinding spindle 30 and the workpiece 11 and the fore and aft axis Z to control a cutting depth of the grinding spindle 30. In accordance with the embodiments, the ECG element 40 may be integral the machine body 50 and the controller 51.

Figure 4:
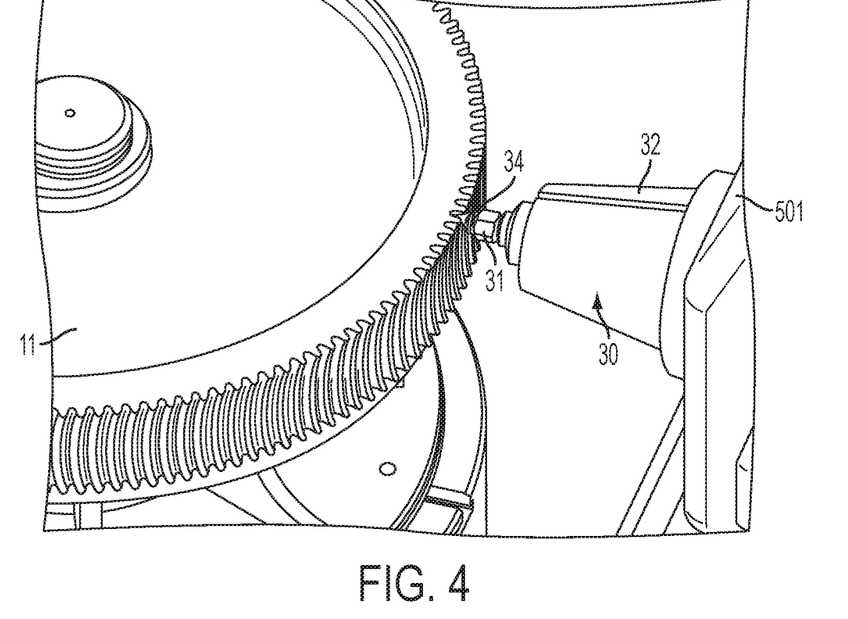
FIG. 4 is an enlarged perspective view of a component for machining a gear in accordance with embodiments.
Figure 5:
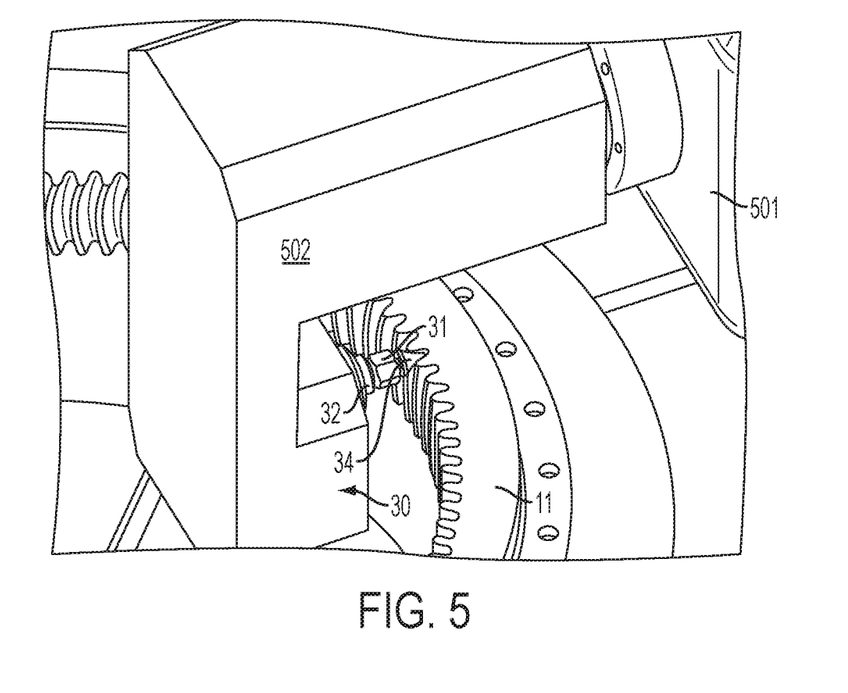
FIG. 5 is an enlarged perspective view of a component for machining a gear in accordance with alternative embodiments.

With reference to FIGS. 4 and 5, it is to be understood that the machine 10 can be employed to machine a gear with outwardly facing gear teeth (see FIGS. 3 and 4) or inwardly facing gear teeth (see FIG. 5). In the latter case, as shown in FIG. 5, the robotic arms 501 may include a hook structure 502. The hook structure 502 extends forwardly along the fore and aft axis Z (see FIG. 3) from the robotic arm 501, downwardly along the vertical axis Y (see FIG. 3) and then reversely along the fore and aft axis Z. The grinding spindle 30 is disposed at the distal end of the hook structure 502.

With the machine 10 provided as described above, the workpiece 11 may be ground or cut by the grinding spindle 30 in various forms and configurations. For example, the grinding spindle 30 may provide the workpiece 11 with gear teeth in one or more of an apex gap-less double-helical shape (or an apex gap-less herringbone shape) and a c-shape.

Figure 6:
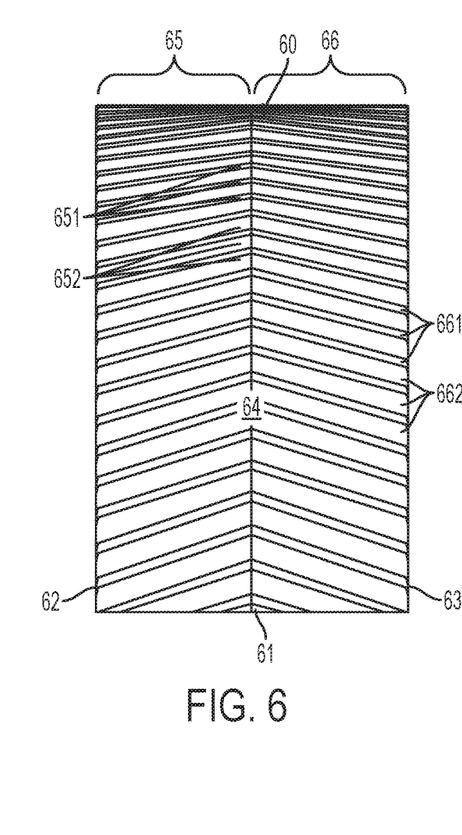
FIG. 6 is a circumferential view of an apex gap-less double helical gear (or an apex gap-less or herringbone gear) in accordance with embodiments.
Figure 7:
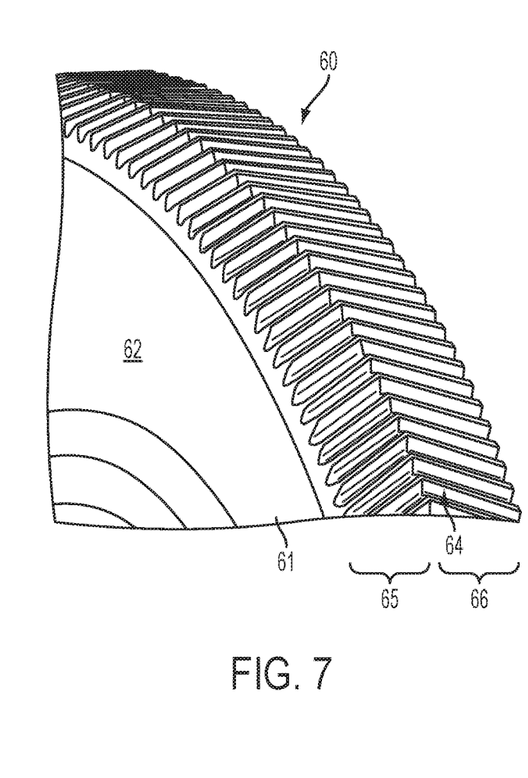
FIG. 7 is a perspective view of the apex gap-less double helical gear of FIG. 6.
Figure 8:
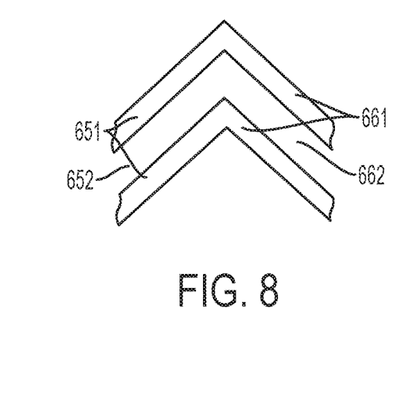
FIG. 8 is an enlarged version of a portion of FIG. 6.

An example of a gear 60 that can be formed by the machine 10 to have gear teeth in an apex gap-less double-helical shaped formation is shown in FIGS. 6, 7 and 8. The gear 60 includes a body 61 defining a central longitudinal axis that would be aligned with the second central longitudinal axis 300, first and second opposite axial faces 62, 63 and a circumferential face 64. The circumferential face 64 is formed by the machine 10 and includes a first annular array 65 of helical gear teeth 651 and helical gear lands 652 of a first hand and a second annular array 66 of helical gear teeth 661 and helical gear lands 662 of a second hand, which is oppositely oriented with respect to the first hand. The first and second annular arrays 65 and 66 converge such that each helical gear tooth 651 abuts a corresponding helical gear tooth 661 and each helical gear land 652 abuts a corresponding helical gear land 662.

As shown in FIGS. 6, 7 and 8, the abutment of each helical gear tooth 651 with the corresponding helical gear tooth 661 and of each helical gear land 652 with the corresponding helical gear land 662 may be achieved with little to no apex region defined between the first and second annular arrays 65 and 66 and without an interruption in the respective shapes of the helical gear teeth 651, 661 or the helical gear lands 652, 662 in the region of the abutment (see FIGS. 6 and 8). Also, a shape of the helical gear teeth 651, 661 may be reflective of the tip 311 of the grinding spindle 30 (see FIG. 7). In addition, it is to be understood that although the gear 60 is illustrated in FIGS. 6 and 7 with the region of the abutment being linear and axially centered, other embodiments exist. For example, the region of the abutment may be offset from an axial center of the gear 60 and the abutment itself may be staggered relative to the axial center of the gear 60.

Figure 9:
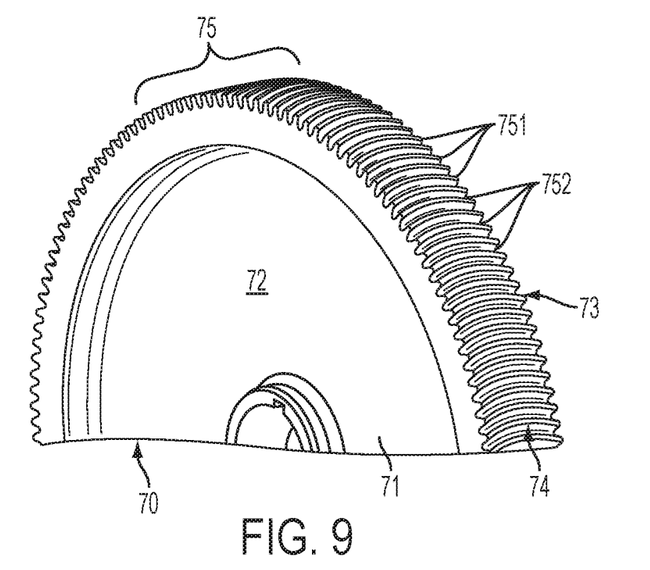
FIG. 9 is a circumferential view of an apex gap-less c-shaped gear in accordance with embodiments.

With reference to FIG. 9, another example of a gear 70 that can be formed by the machine 10 is provided. The gear 70 has gear teeth in an apex gap-less c-shaped formation. The gear 70 includes a body 71 defining a central longitudinal axis that would be aligned with the second central longitudinal axis 300, first and second opposite axial faces 72, 73 and a circumferential face 74. The circumferential face 74 is formed by the machine 10 and includes an annular array 75 of c-shaped gear teeth 751 and c-shaped gear lands 752. Each c-shaped gear tooth 751 has an arcuate face with nearly constant involute transverse profiles corresponding to the shape of the tip 311 of the grinding spindle. In practice, this configuration would be expected to provide a nearly constant pressure angle across the length of the c-shaped gear tooth 751. Like the gear 60, the gear 70 would possess a self-alignment characteristic but with the added benefit of reducing gear tooth end loading due to their inherent ability to adapt to multiple axis misalignment.

Figure 10:
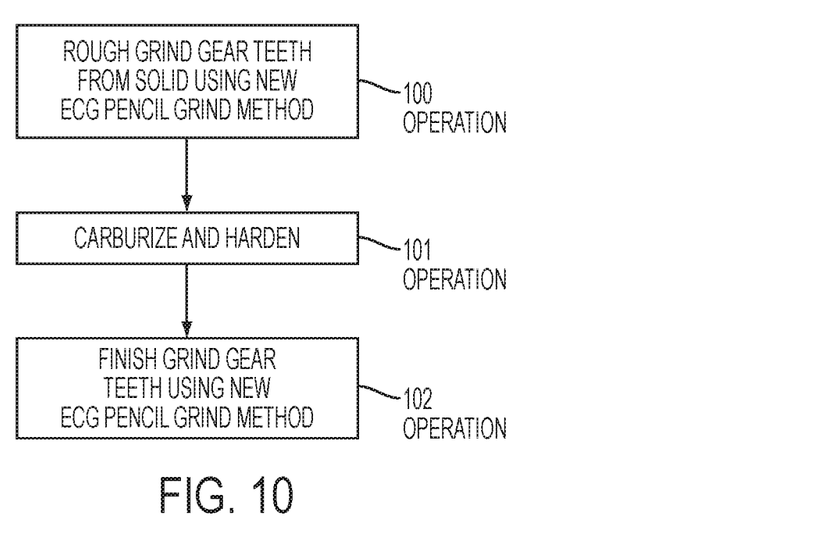
FIG. 10 is a flow diagram illustrating a method of machining gear teeth.

With reference to FIG. 10, a method of machining gear teeth such as the gear teeth described above is provided. As shown in FIG. 10, the method first includes a rough grinding of the gear teeth from a solid, such as a workpiece, using the ECG pencil grinding method described above (operation 100). Once the rough grinding is fully or partially completed, the method further includes a carburization and hardening of the workpiece (operation 101) and a finishing grind of the gear teeth using the ECG pencil grind method described above (operation 102). Of course, it will be understood that the ECG grinding method of operations 100 and 102 need not be limited to the ECG pencil grinding method and can be replaced by an ECG grinding method designed to form any tooth shape (e.g., a tooth shape that is reflective of the tip 311 of the grinding spindle 30 having an involute profile 313).

Figure 11:
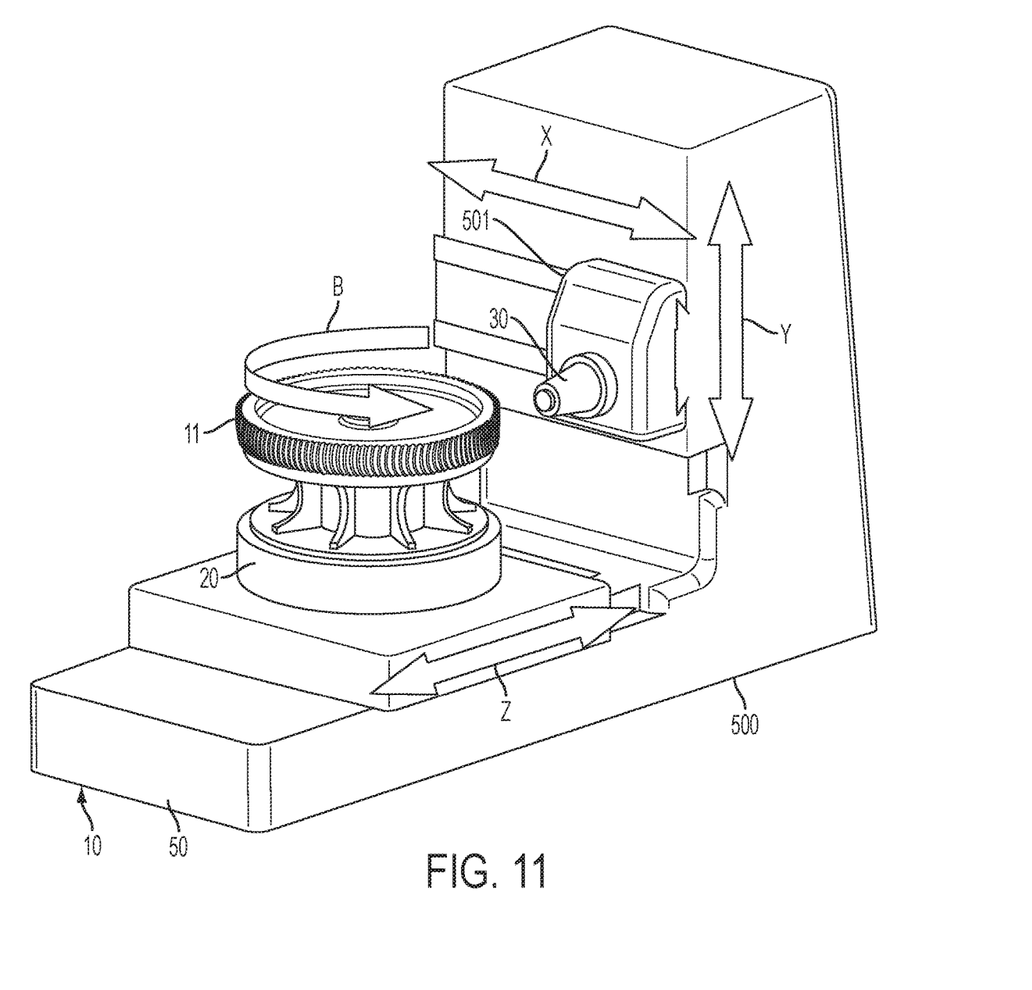
FIG. 11 is a perspective view of the machine for machining a gear in accordance with another aspect of an exemplary embodiment.

In a case in which first longitudinal axis 110 and second longitudinal axis 300 do not intersect, second longitudinal axis 300 passes through workpiece 11 at a position that is off-sect from first longitudinal axis 110 such as shown in FIG. 11. For example, robotic arms 501 may be selectively shifted along the x-axis to a position that causes second axis 300 of spindle 11 to be off-set relative to first axis 110 of workpiece 11. By shifting spindle 30 along the x-axis more complex gear tooth profiles may be achieved. The more complex gear profiles may provide desired operational enhancements to the gearbox.

With the machine 10, gearboxes for helicopters and other weight limited applications, may be designed with higher power densities. This is due to the fact that every pound of weight that is removed from a transmission design as a result of using the machine 10 to fashion gears with apex-less configurations translates into better performance characteristics.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while described in the context of gearboxes used in power dense environments, aspects of the invention can be used to create intermeshing gears in other contexts, such as clock machinery, elevator machinery without limitation. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A machine for machining a workpiece having a first central longitudinal axis passing through a workpiece plane, the workpiece plane being disposed orthogonal to the first central longitudinal axis, the machine comprising:

a grinding spindle having a body, a wheel supporting an abrasive and an insulator electrically isolating the wheel from the body, the wheel being operable to remove material from the workpiece, the grinding spindle having a second central longitudinal axis about which the grinding spindle rotates, the second central longitudinal axis of the grinding spindle passing through the workpiece in the workpiece plane so as to create a continuous gear tooth on the workpiece; and an electrochemical grinding (ECG) element electrically connected to the wheel and the workpiece, the ECG element being configured to execute ECG processing on the grinding spindle and the workpiece to soften the workpiece as the gear tooth is being created by the grinding spindle.

2. The machine according to claim 1, wherein the abrasive comprises a super abrasive.

3. The machine according to claim 1, wherein the abrasive comprises a super abrasive such as cubic boron nitride (CBN).

4. The machine according to claim 1, wherein the tip is one of conical and possessed of an involute profile.

5. The machine according to claim 1, wherein material is removed from the workpiece by the grinding spindle in one or more of an apex gap-less double-helical shape, an apex gap-less herringbone shape and a c-shape.

6. The machine according to claim 1, wherein the ECG element is configured to:
    positively charge the workpiece,
    negatively charge the grinding spindle, and
    dispense electrolytic fluid toward the workpiece with the grinding spindle removing material from the workpiece.

7. The machine according to claim 1, wherein the ECG processing on the grinding spindle and the workpiece facilitates material removal from the workpiece by the grinding spindle to a desired depth in a single pass.

8. The machine according to claim 1, wherein the second central longitudinal axis passes through the workpiece in the workpiece plane offset from the first central longitudinal axis.

9. The machine according to claim 1, wherein the second central longitudinal axis passes through the workpiece in the workpiece plane intersecting the first central longitudinal axis.

10. A gear comprising at least one of apex gap-less double-helical shaped teeth, apex gap-less herringbone shaped teeth and c-shaped teeth, the gear being machined by a process comprising:
    disposing a workpiece having a first central longitudinal axis passing through a workpiece plane of the workpiece disposed orthogonally relative to the first central longitudinal axis on a chuck;
    disposing a grinding spindle having a second central longitudinal axis such that the second central longitudinal axes passes through the workpiece in the workpiece plane;
    executing ECG processing on the grinding spindle and the workpiece;
    using the grinding spindle to remove material from the workpiece to form the at least one of the apex gap-less double-helical shaped teeth, apex gap-less herringbone shaped teeth and c-shaped teeth.

11. The gear according to claim 10, wherein the apex gap-less double-helical shaped teeth, apex gap-less herringbone shaped teeth and c-shaped teeth comprise ground surfaces of less than 1 micro inch Ra and burr free edges.

12. The gear according to claim 10, wherein the workpiece comprises high-hardness conductive materials.

13. The gear according to claim 10, wherein the using of the grinding spindle comprises making a single pass of the grinding spindle to remove material from the workpiece to a desired depth.

14. The gear according to claim 10, wherein disposing the grinding spindle includes positioning the grinding spindle such that the second central longitudinal axes passes through the workpiece plane of the workpiece offset relative to the first central longitudinal axis.

15. The gear according to claim 10, wherein disposing the grinding spindle includes positioning the grinding spindle such that the second central longitudinal axes passes through the workpiece plane of the workpiece intersecting the first central longitudinal axis.

16. A method of machining a gear, comprising:
    disposing a workpiece having a first central longitudinal axis passing through a workpiece plane disposed orthogonally relative to the first central longitudinal axis on a chuck;
    disposing a grinding spindle having a second central longitudinal axis about which the grinding spindle rotates such that the second central longitudinal axis passes through the workpiece in the workpiece plane;
    executing ECG processing on the grinding spindle and the workpiece to soften an area of the workpiece;
    using the grinding spindle to remove material from the area of the workpiece to create a continuous gear tooth having one of apex gap-less double-helical shaped gear teeth, apex gap-less herringbone shaped gear teeth and c-shaped gear teeth.

17. The method according to claim 16, wherein the using of the grinding spindle comprises making a single pass of the grinding spindle to remove material from the workpiece to a desired depth.

18. The method of claim 16, wherein disposing the grinding spindle includes positioning the grinding spindle such that the second central longitudinal axes passes through the workpiece plane of the workpiece offset relative to the first central longitudinal axis.

19. The gear according to claim 16, wherein disposing the grinding spindle includes positioning the grinding spindle such that the second central longitudinal axes passes through the workpiece plane of the workpiece intersecting the first central longitudinal axis.

\* \* \* \* \*

UNITED STATES PATENT AND TRADEMARK OFFICE
CERTIFICATE OF CORRECTION

PATENT NO.        : 9,956,631 B2
APPLICATION NO.   : 15/433726
DATED             : May 1, 2018
INVENTOR(S)       : Bittner It is certified that error appears in the above-identified patent and that said Letters Patent is hereby corrected as shown below:

In the Claims

Column 8, Lines 48-52, should read, (approx.):
19. The method according to claim 16, wherein disposing the grinding spindle includes positioning the grinding spindle such that the second central longitudinal axis passes through the workpiece plane of the workpiece intersecting the first central longitudinal axis.

Signed and Sealed this
Tenth Day of July, 2018

Andrei Iancu
*Director of the United States Patent and Trademark Office*